United States Patent
Jayakumar et al.

(10) Patent No.: US 9,390,209 B2
(45) Date of Patent: *Jul. 12, 2016

(54) SYSTEM FOR AND METHOD OF COMBINING CMOS INVERTERS OF MULTIPLE DRIVE STRENGTHS TO CREATE TUNE-ABLE CLOCK INVERTERS OF VARIABLE DRIVE STRENGTHS IN HYBRID TREE-MESH CLOCK DISTRIBUTION NETWORKS

(71) Applicant: XPLIANT, Inc., San Jose, CA (US)

(72) Inventors: Nikhil Jayakumar, Sunnyvale, CA (US); Vivek Trivedi, Fremont, CA (US); Vasant K. Palisetti, Santa Clara, CA (US); Bhagavati R. Mula, San Jose, CA (US); Daman Ahluwalia, Los Gatos, CA (US); Amir H. Motamedi, Sunnyvale, CA (US)

(73) Assignee: CAVIUM, INC., San Jose, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/141,076

(22) Filed: Dec. 26, 2013

(65) Prior Publication Data

US 2015/0186560 A1   Jul. 2, 2015

(51) Int. Cl.
G06F 17/00 (2006.01)
G06F 17/50 (2006.01)
H03K 5/15 (2006.01)

(52) U.S. Cl.
CPC .......... *G06F 17/505* (2013.01); *G06F 17/5031* (2013.01); *G06F 17/5081* (2013.01); *H03K 5/15* (2013.01); *G06F 2217/06* (2013.01); *G06F 2217/08* (2013.01); *G06F 2217/12* (2013.01); *G06F 2217/62* (2013.01); *G06F 2217/78* (2013.01); *G06F 2217/84* (2013.01)

(58) Field of Classification Search
USPC ........................................................ 716/100
See application file for complete search history.

(56) References Cited

U.S. PATENT DOCUMENTS

| | | |
|---|---|---|
| 5,914,625 A | 6/1999 | Shirata |
| 5,977,810 A | 11/1999 | Shirata |
| 6,166,564 A | 12/2000 | Rosen |
| 6,434,731 B1 | 8/2002 | Brennan et al. |
| 6,574,781 B1 | 6/2003 | Harada et al. |
| 6,609,241 B2 | 8/2003 | Yonemori |
| 6,629,298 B1 | 9/2003 | Camporese et al. |
| 6,657,130 B2 | 12/2003 | Van Dyke et al. |
| 6,678,644 B1 | 1/2004 | Segal |
| 6,698,006 B1 | 2/2004 | Srinivasan |
| 6,763,513 B1 | 7/2004 | Chang et al. |
| 6,951,002 B2 | 9/2005 | Clabes et al. |

(Continued)

*Primary Examiner* — Mohammed Alam
(74) *Attorney, Agent, or Firm* — Haverstock & Owens LLP

(57) ABSTRACT

An electronic device fabrication tool uses only standard-size cells from a cell library to fabricate a clock distribution network on a semiconductor device, thereby reducing the cost of the fabrication process. Target clock drive strengths are determined to reduce skew along the clock-distribution network, and the standard size cells are combined to produce clock-driving components substantially equal to the target clock drive strengths. The cells are combined using VIA programming, by electrically coupling them by adding or removing vias connecting the cells. In hybrid tree-mesh clock distribution networks, VIA programming ensures that the binary tree portions of the network are not affected by the tuning. Preferably, the clock-driving elements are clock inverters or buffers, though other elements are able to be used to drive clock signals on the clock distribution network.

22 Claims, 11 Drawing Sheets

(56) References Cited

U.S. PATENT DOCUMENTS

| | | |
|---|---|---|
| 6,981,233 B2 | 12/2005 | Chang |
| 7,089,520 B2 | 8/2006 | Voldman |
| 7,117,466 B2 | 10/2006 | Kalafala et al. |
| 7,334,209 B1 | 2/2008 | Roberts et al. |
| 7,392,495 B1 | 6/2008 | Cherukupalli et al. |
| 7,546,567 B2 | 6/2009 | Cheon et al. |
| 7,810,061 B2 | 10/2010 | Minonne et al. |
| 7,870,521 B2 | 1/2011 | Palisetti |
| 8,205,182 B1 | 6/2012 | Zlatanovici et al. |
| 8,239,799 B2 | 8/2012 | Riviere-Cazaux |
| 8,266,569 B2 | 9/2012 | Palisetti et al. |
| 8,536,921 B2 | 9/2013 | Gasper et al. |
| 8,629,548 B1 | 1/2014 | Andreev et al. |
| 8,683,416 B1 | 3/2014 | Trivedi et al. |
| 8,739,103 B1 | 5/2014 | Dutta et al. |
| 8,775,996 B2 | 7/2014 | Alpert et al. |
| 8,887,117 B1 | 11/2014 | Chuang |
| 2004/0168140 A1 | 8/2004 | Chang |
| 2006/0080632 A1 | 4/2006 | Ng et al. |
| 2008/0229266 A1 | 9/2008 | Bueti |
| 2008/0276212 A1 | 11/2008 | Albrecht |
| 2008/0317050 A1 | 12/2008 | Xiong |
| 2009/0195274 A1 | 8/2009 | Ohyabu |
| 2009/0199142 A1 | 8/2009 | Arunachalam et al. |
| 2010/0023898 A1 | 1/2010 | Nomura et al. |
| 2011/0046937 A1 | 2/2011 | Kanno |
| 2011/0167396 A1 | 7/2011 | Riviere-Cazaux |
| 2011/0260318 A1 | 10/2011 | Eisenstadt |
| 2012/0216168 A1* | 8/2012 | Buechner et al. .......... 716/133 |
| 2012/0266120 A1* | 10/2012 | Buechner et al. .......... 716/109 |
| 2013/0020707 A1* | 1/2013 | Or-Bach et al. .......... 257/741 |
| 2013/0043923 A1* | 2/2013 | Gasper et al. .......... 327/281 |
| 2013/0046518 A1 | 2/2013 | Mejdrich et al. |
| 2013/0047127 A1 | 2/2013 | Arunachalam |
| 2013/0069703 A1* | 3/2013 | Gasper et al. .......... 327/264 |
| 2014/0028348 A1* | 1/2014 | Andreev et al. .......... 326/41 |
| 2014/0143746 A1 | 5/2014 | Alpert et al. |
| 2015/0171079 A1 | 6/2015 | Or-Bach et al. |
| 2015/0186560 A1 | 7/2015 | Jayakumar et al. |
| 2015/0186583 A1* | 7/2015 | Jayakumar et al. .......... 716/119 |
| 2015/0186589 A1* | 7/2015 | Jayakumar et al. .......... 716/119 |
| 2015/0227646 A1 | 8/2015 | Arunachalam et al. |

* cited by examiner

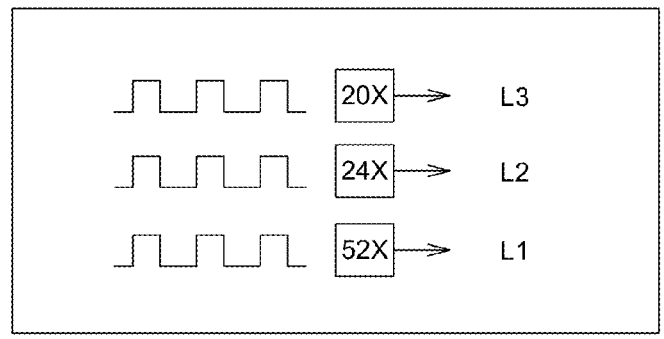
Fig. 2
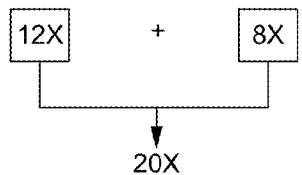
Fig. 3A
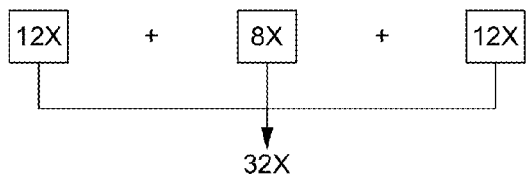
Fig. 3B
Fig. 3C
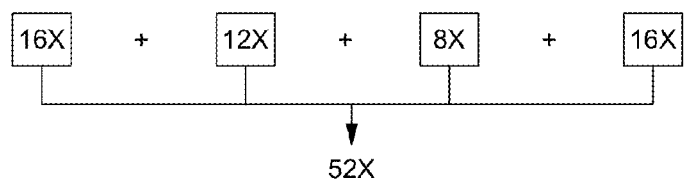
Fig. 3D

```
module xp_ckinvx0 ( A ) ;
input A ;
stdcell_ckinv_x16   xinv1  ( .A(A),  .Q(float1) ) ;
stdcell_ckinv_x12   xinv2  ( .A(A),  .Q(float2) ) ;
stdcell_ckinv_x8    xinv3  ( .A(A),  .Q(float3) ) ;
stdcell_ckinv_x12   xinv4  ( .A(A),  .Q(float4) ) ;
stdcell_ckinv_x16   xinv5  ( .A(A),  .Q(float5) ) ;
endmodule // xp_ckinvx0 module xp_ckinvx8 ( A , Z ) ;
input A ;
output Z ;
stdcell_ckinv_x16   xinv1  ( .A(A),  .Q(float1) ) ;
stdcell_ckinv_x12   xinv2  ( .A(A),  .Q(float2) ) ;
stdcell_ckinv_x8    xinv3  ( .A(A),  .Q(Z) ) ;
stdcell_ckinv_x12   xinv4  ( .A(A),  .Q(float4) ) ;
stdcell_ckinv_x16   xinv5  ( .A(A),  .Q(float5) ) ;
endmodule // xp_ckinvx8 module xp_ckinvx12 ( A , Z ) ;
input A ;
output Z ;
stdcell_ckinv_x16   xinv1  ( .A(A),  .Q(float1) ) ;
stdcell_ckinv_x12   xinv2  ( .A(A),  .Q(float2) ) ;
stdcell_ckinv_x8    xinv3  ( .A(A),  .Q(float3) ) ;
stdcell_ckinv_x12   xinv4  ( .A(A),  .Q(Z) ) ;
stdcell_ckinv_x16   xinv5  ( .A(A),  .Q(float5) ) ;
endmodule // xp_ckinvx12 module xp_ckinvx16 ( A , Z ) ;
input A ;
output Z ;
stdcell_ckinv_x16   xinv1  ( .A(A),  .Q(float1) ) ;
stdcell_ckinv_x12   xinv2  ( .A(A),  .Q(float2) ) ;
stdcell_ckinv_x8    xinv3  ( .A(A),  .Q(float3) ) ;
stdcell_ckinv_x12   xinv4  ( .A(A),  .Q(float4) ) ;
stdcell_ckinv_x16   xinv5  ( .A(A),  .Q(Z) ) ;
endmodule // xp_ckinvx16 module xp_ckinvx28 ( A , Z ) ;
input A ;
output Z ;
stdcell_ckinv_x16   xinv1  ( .A(A),  .Q(float1) ) ;
stdcell_ckinv_x12   xinv2  ( .A(A),  .Q(float2) ) ;
```

Fig. 9A

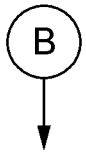

```
endmodule // xp_ckinvx44 module xp_ckinvx48 ( A , Z ) ;
input A ;
output Z ;
stdcell_ckinv_x16   xinv1 ( .A(A), .Q(float1) ) ;
stdcell_ckinv_x12   xinv2 ( .A(A), .Q(Z) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx48 module xp_ckinvx52 ( A , Z ) ;
input A ;
output Z ;
stdcell_ckinv_x16   xinv1 ( .A(A), .Q(Z) ) ;
stdcell_ckinv_x12   xinv2 ( .A(A), .Q(float2) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx52 module xp_ckinvx56 ( A , Z ) ;
input A ;
output Z ;
stdcell_ckinv_x16   xinv1 ( .A(A), .Q(Z) ) ;
stdcell_ckinv_x12   xinv2 ( .A(A), .Q(Z) ) ;
stdcell_ckinv_x8    xinv3 ( .A(A), .Q(float3) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx56 module xp_ckinvx64 ( A , Z ) ;
input A ;
output Z ;
stdcell_ckinv_x16   xinv1 ( .A(A), .Q(Z) ) ;
stdcell_ckinv_x12   xinv2 ( .A(A), .Q(Z) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx64
```

Fig. 9C

SYSTEM FOR AND METHOD OF COMBINING CMOS INVERTERS OF MULTIPLE DRIVE STRENGTHS TO CREATE TUNE-ABLE CLOCK INVERTERS OF VARIABLE DRIVE STRENGTHS IN HYBRID TREE-MESH CLOCK DISTRIBUTION NETWORKS

FIELD OF THE INVENTION

This invention relates to integrated circuits. More particularly, this invention relates to clock distribution networks on semiconductor devices.

BACKGROUND OF THE INVENTION

For a semiconductor device to function properly, it must distribute clock signals to its parallel "sequential elements," such as flip-flops, latches, and memory, at approximately the same time. When clock signals arrive at these parallel elements at different times, the resulting "clock skew" can cause a variety of problems, including setup and hold violations, which can jeopardize the integrity of data transmitted along the device.

Large-scale semiconductor devices reduce skew by using clock distribution networks to distribute clock signals to the elements on the device. To ensure that the rise times and fall times of the clock signals meet design requirements, CMOS inverters or buffers are inserted at regular intervals. (Because inverters and buffers have similar functions in clock distribution networks, these terms are used interchangeably in this application and are also referred to as clock-drivers or clock-driving elements.) The network may diverge at multiple points. This divergence of the clock network and the insertion of CMOS inverters in the clock cause the clock skew to increase. The clock skew can increase for other reasons, such as structural problems, variations in loads along the clock distribution network, variations in process, voltages, or temperature of the inverters, and other effects in the interconnects in the clock distribution network.

One structure used to reduce clock skew is a clock mesh, which introduces interconnect elements, called cross-links, to short outputs of the inverters in the clock distribution network. These cross-links reduce the delay of the clock signals between clock-driving elements, thereby reducing clock skew, though at the expense of short-circuit power. A second structure used to reduce clock skew is a hybrid-tree mesh, such as the hybrid-tree mesh 100 of FIGS. 1A-B. The mesh portion of the hybrid-tree mesh 100, shown in FIG. 1A, includes a spine 110 supporting ribs 120 and 130, inverters 121A-D on the rib 120, cross-links 121 and 122 coupling clock-driving elements on the ribs 120 and 130, and a non-rectilinear clock mesh region 140. While FIG. 1A shows cross-links between elements along the ribs 120 and 130, in other structures, cross-links are inserted at other locations or combinations of locations in the clock-distribution network, such as within the clock-distribution network, at its end, or both. The mesh portion 100 is in turn driven by a hierarchical binary tree structure 150 shown in FIG. 1B, in which a clock-driving element 145 (level L2) drives 4 clock-driving elements 120A-C (level L1), and a clock-driving element 160 (level L3) drives element 145 and other elements on level L2.

While FIGS. 1A-B show several inverters, ribs, and cross-links to simplify the drawings, clock distribution networks typically have hundreds of thousands of these components directing clock signals to thousands of clock-receiving (sequential) elements. These elements represent different loads to the clock-distribution network, resulting in higher skew, as do other structures such as the non-rectilinear component 140 in FIG. 1A.

In order to reduce short-circuit power, it is important to keep the skew between the inputs of inverters whose outputs are shorted as low as possible. Thus, it is important to reduce the structural skew of the clock distribution network at design time. It may not be possible to guarantee that inverters of a clock distribution network whose outputs are shorted with a cross-link have the same load characteristics. Hence, a tune-able clock inverter is required to reduce the structural skew. The clock inverters are tuned so that those that drive large loads have large drive strengths and those that drive smaller loads have smaller driver strengths. In the last stage of a hybrid tree-mesh clock distribution network, the loads can vary substantially due to various reasons including variation in flip-flop density and non-rectilinear clock mesh regions.

These clock distribution networks normally use custom-made clock-driving elements to drive the different loads. This approach is expensive and time-consuming for many design teams, especially those that purchase standard cells.

BRIEF SUMMARY OF THE INVENTION

In accordance with the principles of the invention, a tune-able clock inverter with drive strengths in a range of values is produced using only a base set of standard size clock inverters from a standard cell library. Using this base set of inverters, clock inverters can be tuned during the fabrication process to reduce skew.

In one aspect of the invention, a computer-aided design process for manufacturing a semiconductor device having a clock distribution network, such as a hybrid tree-mesh clock distribution network, thereon, includes determining target drive strengths of clock signals for multiple sequential components on the semiconductor device, determining groups of standard clock-driving elements on the semiconductor device, wherein each of the groups has a group drive strength equal to a sum of the drive strengths of the clock-driving elements in the group, each of the group drive strengths substantially equal to one of the target drive strengths, and determining a fabrication process for combining the clock-driving elements into the groups. Representations of the clock-driving elements are stored in a standard-cell library.

The clock-driving elements are combined into groups by electrically coupling the clock-driving elements in each group using vias. The fabrication process includes forming standard clock-driving elements on adjacent metal layers of the semiconductor device. As one example, the clock-driving elements are inverters, buffers, or both, and have drive strengths of 8×, 12×, and 16×. A netlist defining the groups of the clock-driving elements is generated. In one embodiment, groups are determined using a criterion, such as minimizing a number of standard-size cells in a group or minimizing power dissipation in a group.

In a second aspect of the invention, a system for fabricating a semiconductor device containing a clock distribution network includes a cell library containing macrocells for generating clock-driving elements in a clock distribution network, the macrocells all from a standard cell library, synthesis logic configured to group combinations of the macrocells such that clock signal drive strengths of the groups correspond to required clock signal drive strengths of clock-receiving components on the semiconductor device, and place-and-route logic for determining a layout of the semiconductor device. The place-and-route logic forms the clock-driving elements on adjacent metal layers of the semiconductor device. Preferably, the system also includes timing-and-analysis logic for determining skew in the clock-distribution network, and extraction logic for determining whether the skew is within a pre-determined range.

In a third aspect of the invention, a method of fabricating a clock distribution network includes forming multiple standard-size clock-driving elements on a multiple-layer substrate, wherein each of the clock-driving elements is for transmitting a clock signal with a corresponding drive strength, and combining the clock-driving elements on the multiple-layer substrate into groups, wherein each of the groups has a drive strength equal to a sum of drive strengths of the clock-driving elements in the group, and the groups have drive strengths in a tune-able range of values.

In a fourth aspect of the invention, a semiconductor device includes a clock distribution network comprising multiple standard-size clock-driving elements on a substrate. Each of the clock-driving elements is for transmitting a clock signal with a corresponding drive strength. The clock-driving elements are combined into groups, each of which has a drive strength equal to a sum of the drive strengths of the clock-driving elements in the group. The groups having a tuneable range of values, for driving sequential elements on the semiconductor device.

BRIEF DESCRIPTION OF THE SEVERAL VIEWS OF THE DRAWINGS

The following figures are used to illustrate embodiments of the invention. In all the figures, the same label refers to the identical or a similar element.

FIG. 2 schematically shows a portion of a clock distribution network driving sequential elements that present different loads to the network.

FIGS. 3A-D are diagrams used to illustrate how standard-size cells are combined to tune a clock-distribution network in accordance with the principles of the invention.

FIGS. 9A-C are a Verilog netlist illustrating how tune-able clock inverters are constructed in accordance with one embodiment of the invention.

DETAILED DESCRIPTION OF THE INVENTION

Figure 1A:
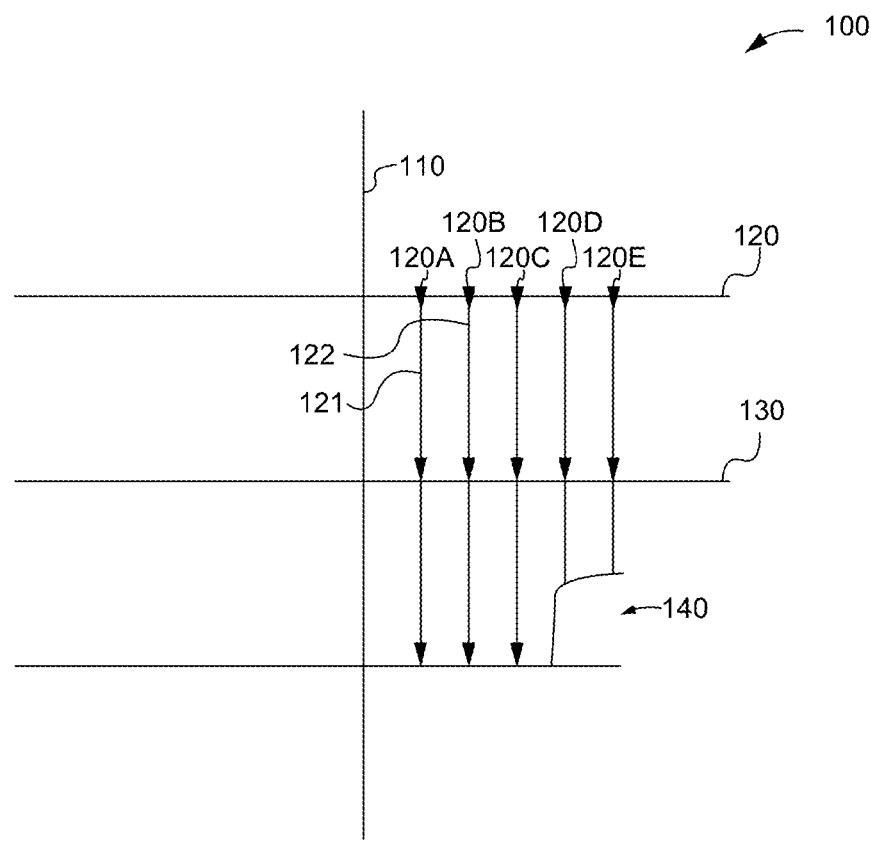
FIGS. 1A-B are high-level diagrams of portions of a prior art mesh-tree hybrid clock distribution network.

In accordance with the principles of the invention, a semi-conductor-device clock-distribution network uses only standard sized inverters, regardless of the drive strengths needed to drive sequential (clock-receiving) elements on the device. Because custom-sized inverters do not have to be fabricated or purchased from third parties, the design process is less expensive than prior art processes. Furthermore, because these standard-sized inverters have been more thoroughly tested and function more predictably, the time for debugging semiconductor devices using these clock distribution networks is reduced, allowing products to be brought to market more quickly.

As one example, during the electronic design automation, a drive strength for a clock-receiving component is determined. The system determines a combination of the custom-sized CMOS inverters, such that their combined drive strength is large enough to drive the sequential element yet small enough to minimize short-circuit power. The combination of custom-sized components is then simulated and, later, the corresponding inverters are placed and routed to form the physical semiconductor device. The resulting clock inverter drives the various loads on a single semiconductor device while maintaining low skew and has a range of drive strengths and enough granularity to maintain a low skew.

In one embodiment, the standard sized inverters (or other "clock-driving" elements) have drive strengths of 0×, 8×, 12×, and 16×. These inverters are able to be combined to form tuneable inverters of drive strengths 0×, 8×, 12×, 16.∴, 20× (8×+12×), 24× (12×+12×), 28× (20×+8×), 32× (16×+16×), 36× (8×+12×+16×), 40× (8×+16×+16×), 44× (12×+16×+16×), 48× (16×+16×+16×), 52× (8×+12×+16×+16×), 56× (8×+16×+16×+16×), and 64× (16×+16×+16×+16×). It will be appreciated that other inverter drive strengths are able to be combined to form these values, for example, a 24× drive strength is able to be formed by 3 inverters with 8× drive strengths. Preferably, the drive strength is determined by combining the fewest numbers of inverters. In other words, in one example, a drive strength of D is determined by combining inverters according to the formula:

$$D\times = 8\times *a + 12\times *b + 16\times *c \qquad \text{Equation (1)}$$

where a+b+c (the total number of inverters) is minimized. In accordance with the principles of the invention, using other design constraints, other selection criteria are able to be used.

By combining inverters into various groups, a distributed clock network is able to generate "ganged" inverters having a pre-determined range of values. In this example, clock inverters are able to have any value in the range 0× (e.g., where a dummy load is needed merely for symmetry) to 64×, with the values 0×, 8×, 12×, 16× to 56×, in 4× increments, and 64×. It will be appreciated that using different standard-sized inverters, other ranges of signal strengths in other increments are able to be produced.

FIG. 2 schematically illustrates a portion of a distributed clock network 200 driving 3 different loads, L1, L2, and L3. The clock network 200 is able to form part of any semiconductor device, such as a microprocessor. During the synthesis of the semiconductor device 200, the load values L1, L2, and L3 are determined. In this example, the values L1, L2, and L3 are different from each other because of variations in flip-flop density and non-rectilinear clock meshes. Those skilled in the art will recognize that the loads are able to vary for other reasons.

The load L1 requires a clock signal with a 20× drive strength, the load L2 requires a clock signal with a 24× drive strength, and the load L3 requires a clock signal with a 52× drive strength. The inverters of the clock distribution network are fabricated using only standard-sized cells, of drive strength values 8×, 12×, and 16×. The clock signal with the 20× drive strength is fabricated by combining or "ganging" two standard-size inverters with drive strengths of 8× and 12×, respectively. The clock signal with the 24× drive strength is fabricated by combining two standard-size inverters with drive strengths of 8× and 16×, respectively. The clock signal with the 52× drive strength is fabricated by combining four standard-sized inverters with drive strengths of 16×, 16×, 12×, and 8×, respectively. In this example, the synthesis step is followed by simulation, timing analysis, placement and routing, extraction, and verification steps.

FIGS. 3A-D illustrate how a standard cell library of only 3 cells, with drive strengths of 8×, 12×, and 16× (FIG. 3A) are able to be combined to produce cells with drive strengths of 20× (FIG. 3B), 32× (FIG. 3C), and 52× (FIG. 3D), to give only a few examples of the possible combinations.

Figure 1B:
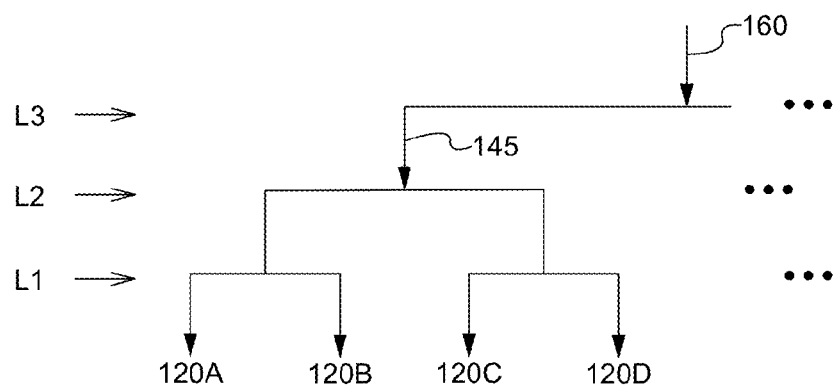

In one embodiment, the standard-size inverters are all fabricated on one or more layers of a semiconductor device. The inverters are combined or "tuned" by VIA programming, that is, by adding or removing vias that electrically couple the inverters together and to an output pin that drives the sequential elements. Referring to FIG. 1B, tuning in this way does not affect the upstream elements (e.g., 145 and 160) in the clock distribution network.

In one embodiment, the base cells are combined to produce a tune-able clock inverter using "VIA34 programming." The base cells are placed on adjacent rows of the semiconductor device, one on top of another, and drawing in the metal layer 4 (M4) of the semiconductor device straps connected to the output net. The M4 straps are, in turn, able to be connected through higher metal layers. Thus, the base cell's output is able to be connected to or disconnected from the output net by respectively inserting or removing a via from the metal 3 layer (M3) to M4. All other metal layers and vias are left untouched. Thus, the drive strength of the clock inverters is able to be tuned merely by adding or removing a via (VIA34) between two layers (M3 and M4).

Figure 4:
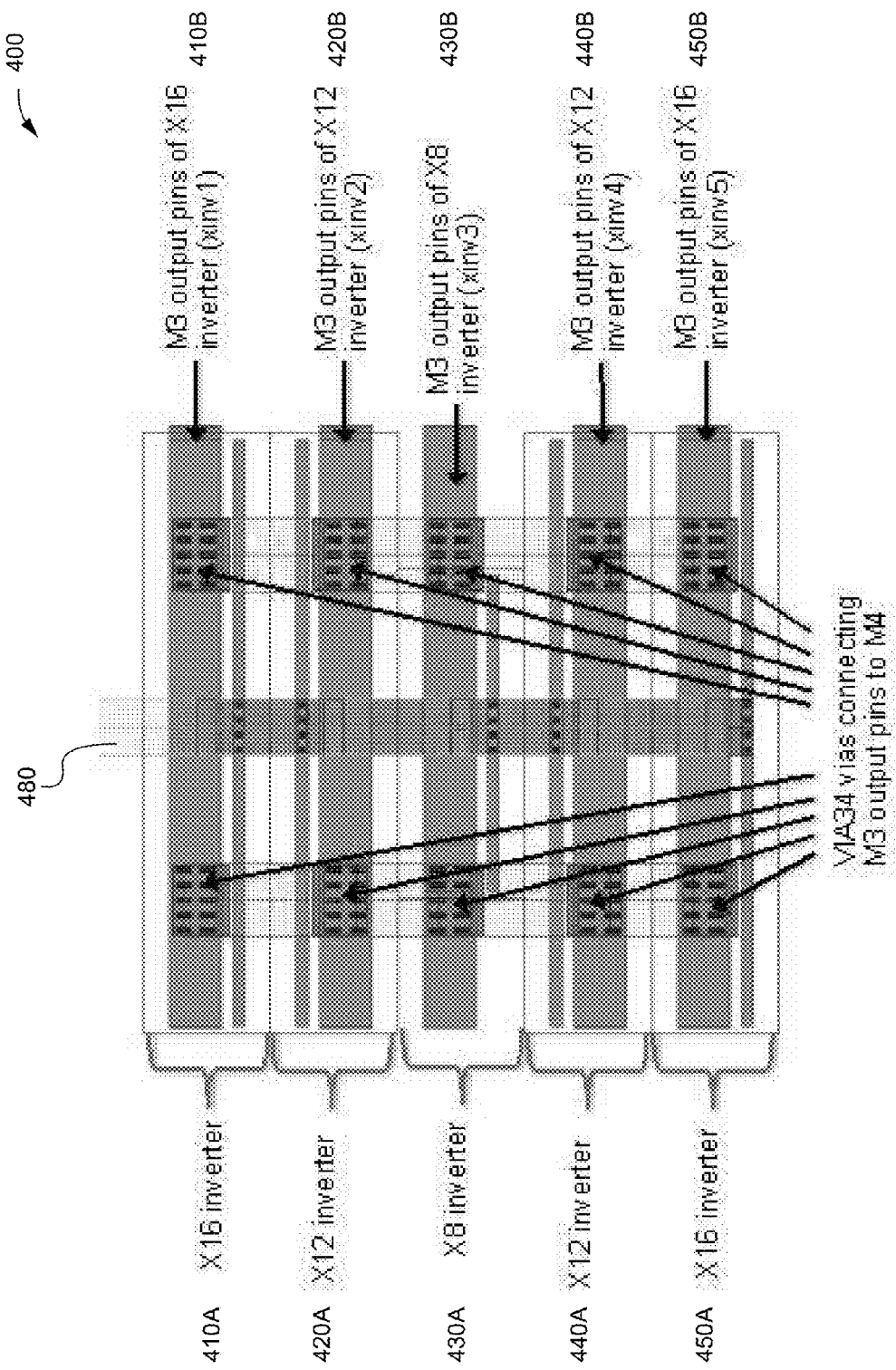
FIGS. 4-6 are semiconductor device layouts showing programming of 64×, 32×, and 0× strength clock inverters, respectively, in accordance with embodiments of the invention.
Figure 5:
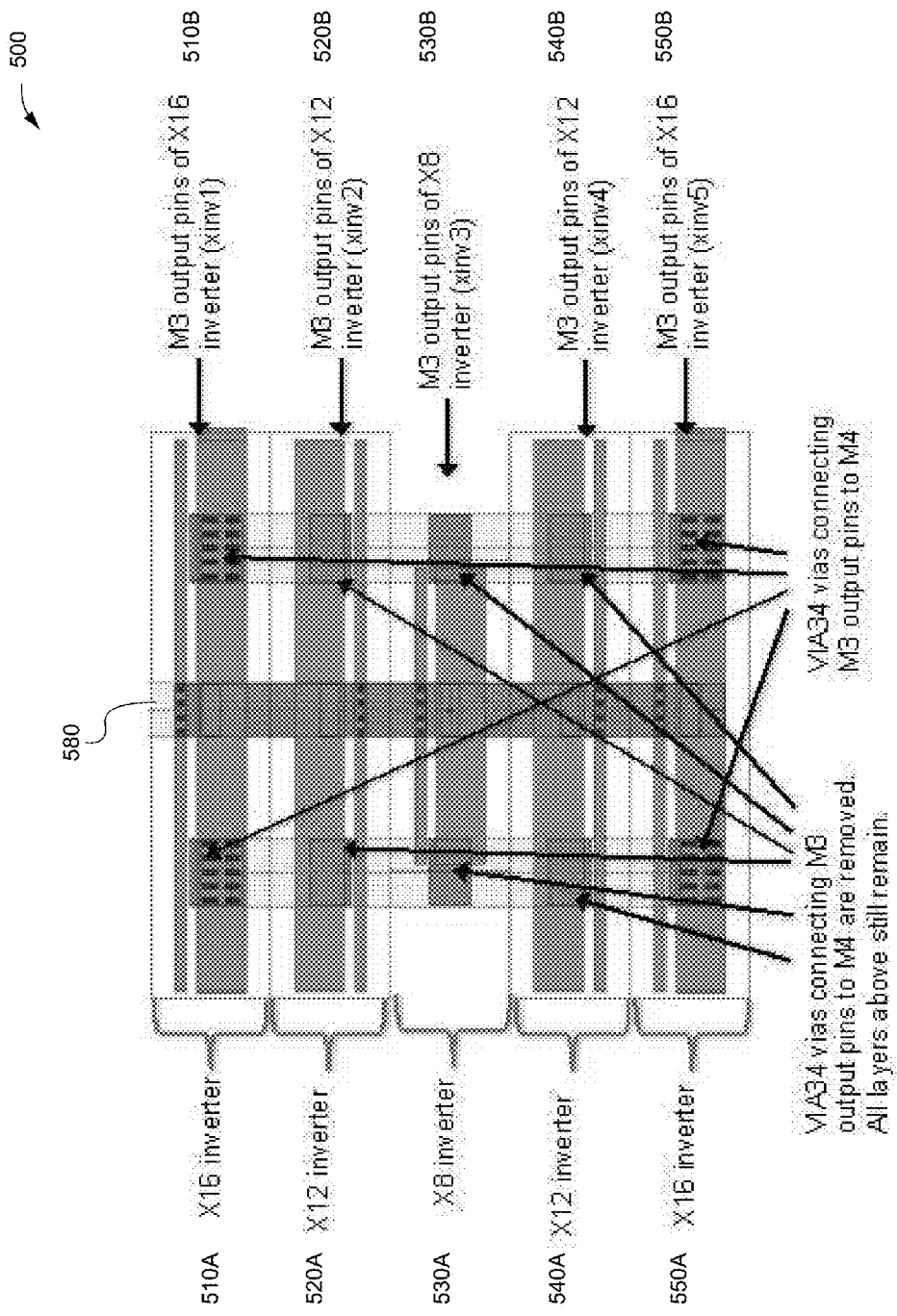
Figure 6:
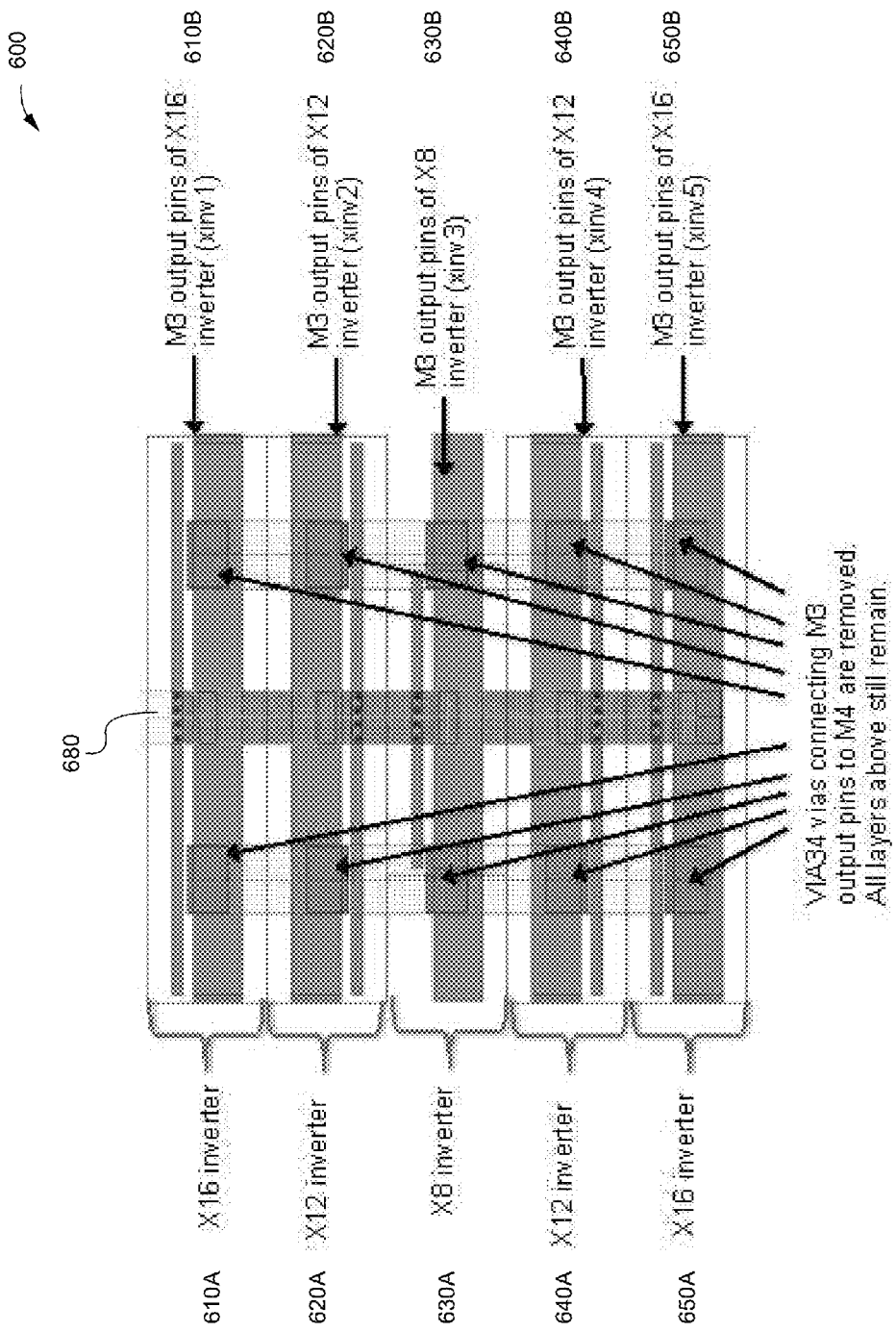

FIGS. 4-6 are layouts showing VIA34 programming of 64×, 32×, and 0× drive strength clock inverters, respectively, using the same (base) standard-size clock cells in M4 and output pins for each of the cells in M3. Each of the layouts shows a left-hand side that contains 16×, 12×, 8×, 12×, and 16× inverters in M4, a right-hand side that contains output pins of the respective inverters in M3, and vias between M3 and M4 for electrically coupling the inverters on the left-hand side to their respective output pins FIG. 4, for example, is a layout 400 with vias 480 programmed to connect all the M3 output pins (410B, 420B, 430B, 440B, 450B) to all the 16×, 12×, 8×, 12×, and 16× inverters (410A, 420A, 430A, 440A, 450A), thereby producing a clock signal on the output pins with a combined drive strength of 16×+12×+8×+12×+16×, or 64×. FIG. 5 is a layout 500 with vias 580 programmed to connect two M3 output pins (510B and 550B) to the outputs of the two corresponding 16× inverters (510A and 550A), thereby producing a clock signal with a combined drive strength of 16×+16×, or 32×. FIG. 6 is a layout 600 with vias 680 connecting the M3 output pins to the 16×, 12×, 8×, 12×, and 16× inverters removed, thereby producing a 0× (dummy) drive strength clock inverter. Those skilled in the art will recognize other VIA34 programming for combining clock elements to produce clock signals with other clock strengths.

Figure 7:
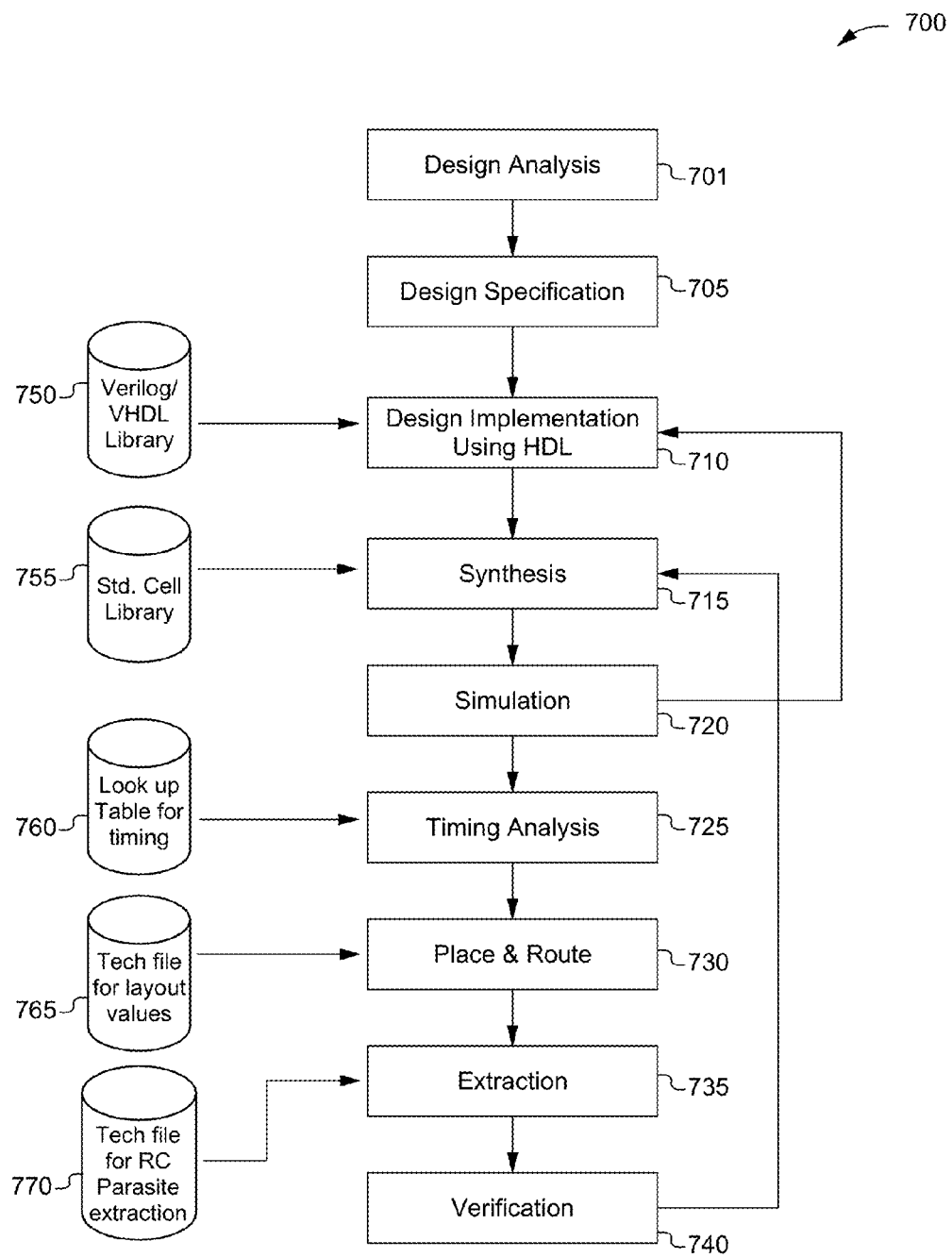
FIG. 7 is a flow chart of the steps of a digital design flow, including combining clock-driving elements in a clock-distribution network in accordance with one embodiment of the invention.

FIG. 7 illustrates a flow chart of the steps 700 of a digital design flow for a semiconductor device with corresponding hardware components, used in accordance with embodiments of the invention. The design analysis, design specification, and design implementation using a hardware-description language and a Verilog/VHDL library 750, occurs in the steps 701, 705, and 710, respectively. The synthesis step occurs in the step 715, using a standard cell library 755. In this step, which can include a number of sub-steps, building blocks of the components, including the clock distribution network and sequential components, are synthesized. The clock-distribution network is synthesized using only standard-size cells. At this stage, the logic circuits are determined. The output of the synthesis step 715 is a netlist, an ASCII file that indicates the devices and interconnections between them. The simulation occurs in the step 720, using the netlist to verify the design and, if not to specification, the process loops back to the step 710. Otherwise, the process continues to the timing analysis in the step 725 where, for example, skew is determined. The step 725 is followed by placement and routing in the step 730, extraction in the step 735, in which components that affect performance are extracted and examined, and the verification step 740, in which the device is fabricated or the design is reworked for optimization or modification. If the design must be modified, the process loops back to the step 720.

As shown in FIG. 7, the timing analysis step 725 accesses a Look-up Table for Timing 760, the placement-and-routing step 730 accesses a Tech file for layout values 765, and the extraction step 735 accesses a Tech File for RC parasite extraction 770.

It will be appreciated that the steps 700 are merely illustrative of one embodiment of the invention. In other embodiments, other steps are added, some steps are combined, and the sequence of steps are performed in different orders, to name only a few modifications.

Figure 8:
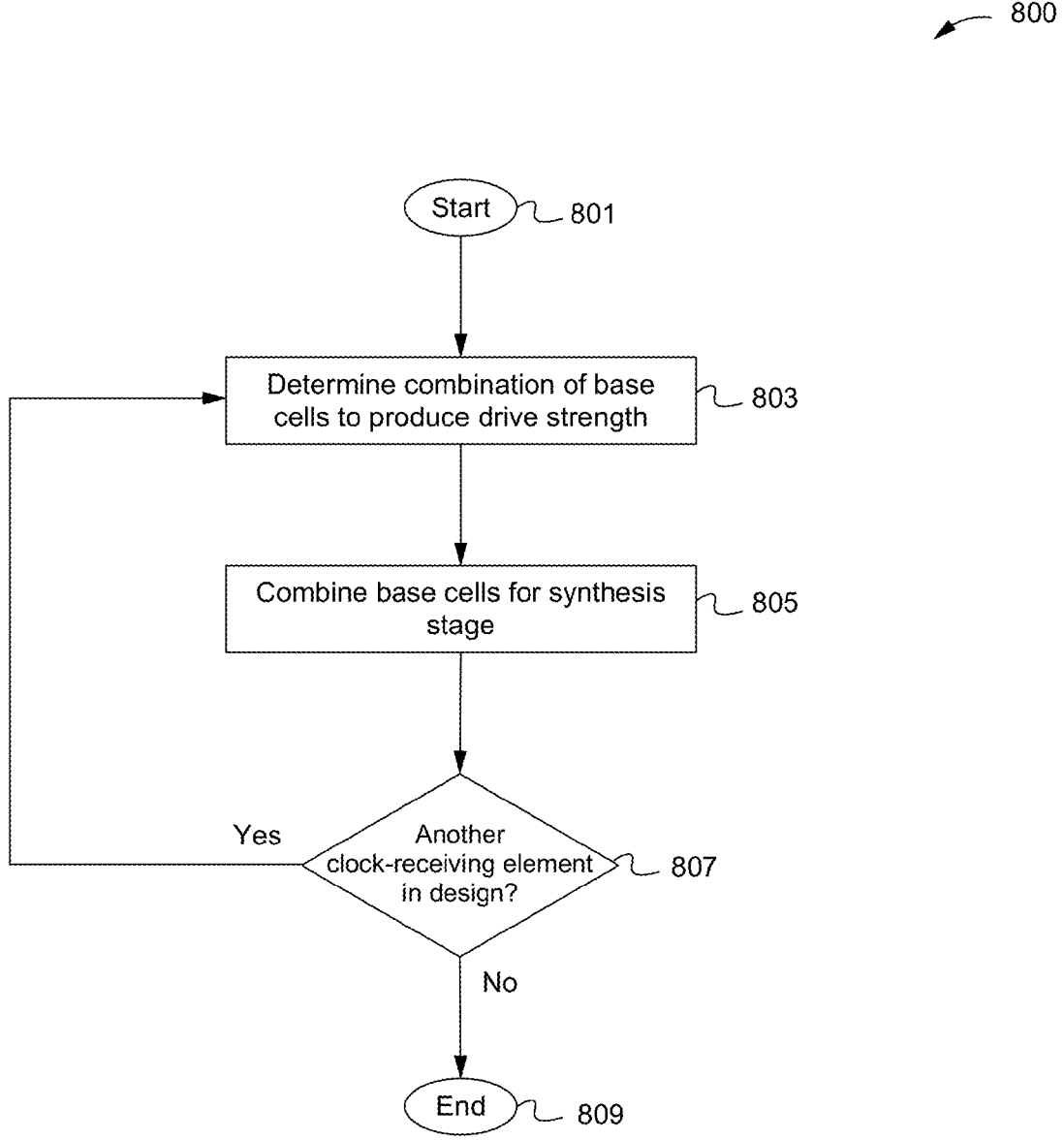
FIG. 8 is a flowchart of the steps of a process for combining standard-size clock-driving elements in accordance with one embodiment of the invention.

FIG. 8 shows the steps 800 for determining the standard-cell inverters stored in the standard cell library 755 in FIG. 7. At this stage in the process, the loads on each clock inverter (and thus the required or "target" drive strengths) have been determined, such as in the synthesis step 715, the verification step 740, or some other step. In the start step 801, a first clock-receiving element driven by a target drive strength is selected. In the step 803, combinations of standard-size macrocells stored in the standard cell library are determined to produce the appropriate clock drive strength signal, such as shown in Equation 1 above. In the step 805, these inverters are then combined or "ganged" to produce the target drive strengths using VIA programming, such as shown in FIGS. 4-6. In the step 807, the process determines whether there is another clock-receiving element in the design and, if so, loops back to the step 803; otherwise, the process ends in the step 809.

It will be appreciated that the steps 800 are merely illustrative of one embodiment of the invention. In other embodiments, other steps are added, some steps are combined, and the sequence of steps are performed in different orders, to name only a few modifications.

Figure 9B:
Figure 9B:
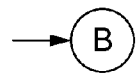

FIGS. 9A-C together illustrate a Verilog netlist 900 showing how a tune-able clock inverter is constructed in accordance with one embodiment of the invention. In this example, the tuneable clock inverters are xp_ckinvx0, xp_ckinvx8, xp_ckinvx12, xp_ckinvx16, xp_ckinvx20, xp_ckinvx24, xp_ckinvx28, xp_ckinvx32, xp_ckinvx36, xp_ckinvx40, xp_ckinvx44, xp_ckinvx48, xp_ckinvx52, xp_ckinvx56, and xp_ckinvx64, which represent, respectively, the 0×, 8×, 12×, 16×, 24×, 28×, 32×, 36×, 40×, 44×, 48×, 52×, 56×, and 64× drive strengths. The base standard cells used to construct the tune-able clock inverters are two stdcell_ckinv_x16 cells, two stdcell_ckinv_x12_cells, and one stdcell_ckinv_x8 cell. The stdcell_ckinv_x16, stdcell_ckinv_x12, and stdcell_ckinv_x8 cells represent, respectively, the 16×, 12×, and 8× drive strength clock inverters from the standard cell library. The input net is "A" and the output net is "Z."

Figure 10:
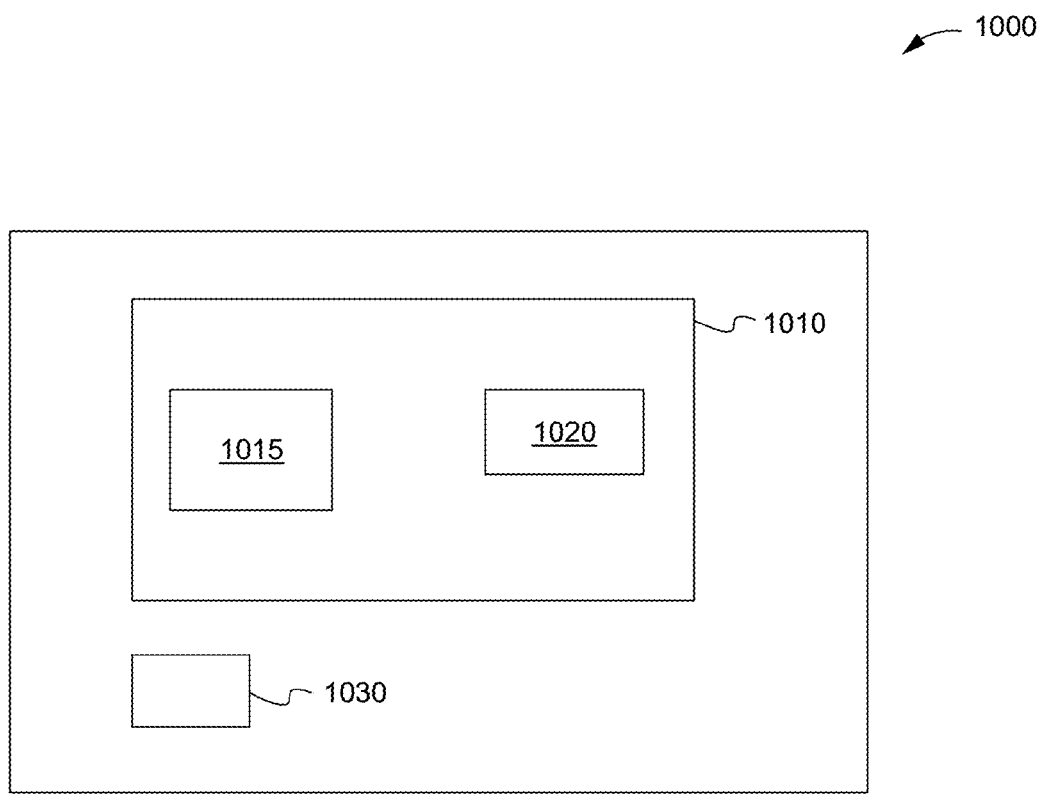
FIG. 10 is a block diagram of a design tool for performing the digital design flow in FIG. 7, in accordance with one embodiment of the invention.

FIG. 10 is a block diagram of an electronic design tool 1000 in accordance with one embodiment of the invention. Referring to FIGS. 7, 8, and 10, the electronic design tool 1000 includes a processor 1030 and a memory 1010. The memory 1010 stores a computer-readable medium containing computer-executable instructions for performing the steps 700 and 800 and also containing the data 750, 755, 760, 765, and 770.

In operation, an electronic design tool is used to fabricate a semiconductor device that includes a clock distribution network. The loads on the sequential elements on the clock distribution network are determined and the drive strengths are determined to reduce skew on the clock distribution network. The inverters on the clock distribution network are fabricated from standardized or "base" cells from a standard cell library, thereby reducing the cost and manufacturing time for fabricating the clock distribution network and thus the semiconductor device as a whole. Advantageously, these base cells can be used to "tune" the drive strengths within a range of values.

Methods and apparatus for placing and routing clock stations and for tuning clock networks in accordance with the invention are described in "System for and Method of Placing and Routing Clock Stations Using Variable Drive-Strength Clock Drivers Built Out of a Smaller Subset of Base Cells for Hybrid Tree-Mesh Clock Distribution Networks," by N. Jayakumar et al. Ser. No. 14/141,096 filed Dec. 26, 2013, and "System for and Method of Tuning Clock Networks Constructed Using Variable Drive-Strength Clock Inverters With Variable Drive-Strength Clock Drivers Built Out of a Smaller Subset of Base Cells," by N. Jayakumar et al. Ser. No. 14/141, 104, filed Dec. 26, 2013, both of which are incorporated by reference in their entireties.

The embodiments given above are shown merely for illustration and are not meant to limit the scope of the invention. It will be readily apparent to one skilled in the art that other modifications may be made to the embodiments without departing from the spirit and scope of the invention as defined by the appended claims.

We claim:

1. A computer-aided design process for manufacturing a semiconductor device having a clock distribution network thereon, the method comprising:
    determining target drive strengths of clock signals for multiple sequential components on the semiconductor device;
    determining groups of standard clock-driving elements on the semiconductor device, wherein each of the groups has a group drive strength equal to a sum of the drive strengths of the clock-driving elements in the group, each of the group drive strengths substantially equal to one of the target drive strengths;
    determining a fabrication process for combining the clock-driving elements into the groups; and
    fabricating the clock distribution network on the semiconductor device according to the fabrication process, wherein the clock distribution network includes a plurality of standard clock-driving elements in a first layer of the semiconductor device and output pins of each of the standard clock-driving elements in a second layer, and further wherein the fabricating comprises, for each of the determined groups, electrically coupling together the standard clock-driving elements of that group with vias between the first layer and the second layer.

2. The computer-aided design process of claim 1, wherein representations of the clock-driving elements are stored in a standard-cell library.

3. The computer-aided design process of claim 1, wherein the fabricating comprises forming the standard clock-driving elements on adjacent metal layers of the semiconductor device.

4. The computer-aided design process of claim 1, wherein drive strengths of the standard clock-driving elements comprise 8×, 12×, and 16×.

5. The computer-aided design process of claim 1, wherein the clock-driving elements comprise inverters, buffers, or both.

6. The computer-aided design process of claim 1, wherein the fabrication process comprises generating a netlist defining the groups of the clock-driving elements.

7. The computer-aided design process of claim 1, wherein determining the groups comprises a grouping criterion, the grouping criterion one of a minimizing a number of standard-size cells in a group and minimizing power dissipation in a group.

8. The computer-aided design process of claim 1, wherein the clock-distribution comprises a hybrid tree-mesh.

9. A system for fabricating a semiconductor device containing a clock distribution network comprising:
    a semiconductor device having clock-receiving elements and a clock distribution network, the network comprising a plurality of clock-driving elements on a substrate of the semiconductor device, wherein each of the clock-driving elements is for transmitting a clock signal with a corresponding drive strength;
    a cell library containing macrocells representing the clock-driving elements in the clock distribution network, the macrocells all from a standard cell library;
    synthesis logic configured to group combinations of the macrocells such that clock signal drive strengths of the groups correspond to required clock signal drive strengths of the clock-receiving elements on the semiconductor device; and
    place-and-route logic for determining a layout of the semiconductor device.

10. The system of claim 9, wherein the place-and-route logic forms the clock-driving elements on adjacent metal layers of the semiconductor device.

11. The system of claim 9, wherein the clock-driving elements comprise clock inverters, buffers, or both.

12. The system of claim 9, further comprising timing-and-analysis logic for determining skew in the clock-distribution network.

13. The system of claim 12, further comprising extraction logic for determining whether the skew is within a pre-determined range.

14. A method of fabricating a clock distribution network comprising:
    forming multiple standard-size clock-driving elements on a first layer of a multiple-layer substrate and output pins of each of the standard clock-driving elements on a second layer of the multiple-layer substrate, wherein each of the clock-driving elements is for transmitting a clock signal with a corresponding drive strength; and
    combining the clock-driving elements on the multiple-layer substrate into groups by electrically coupling each of the clock-driving elements of a group together with vias between the first layer and the second layer, wherein each of the groups has a drive strength equal to a sum of drive strengths of the clock-driving elements in the group, and the groups have drive strengths in a tune-able range of values.

15. The method of claim 14, wherein each layer on the multiple-layer substrate contains one of the standard-sized clock-driving elements.

16. The method of claim 14, wherein at least one of the multiple layers contains two or more of the standard-size clock-driving elements.

17. The method of claim 14, wherein the clock-driving elements comprise clock inverters, buffers, or both.

18. A semiconductor device comprising:
 a clock distribution network comprising multiple standard-size clock-driving elements on at least a first layer of a substrate and output pins of each of the clock-driving elements on a second layer of the substrate, wherein each of the clock-driving elements is for transmitting a clock signal with a corresponding drive strength, the clock-driving elements combined into groups, each of the groups having a drive strength equal to a sum of the drive strengths of the clock-driving elements in the group, the groups having a tune-able range of values for driving sequential elements on the semiconductor device, wherein each of the clock-driving elements of one of the groups are electrically coupled together with vias between the first layer and the second layer.

19. The semiconductor device of claim 18, wherein the standard-size clock-driving elements are formed on multiple layers of the substrate.

20. The semiconductor device of claim 18, wherein the clock-driving elements comprise clock inverters, buffers, or both.

21. The semiconductor device of claim 18, wherein the clock-distribution network is a hybrid tree-mesh clock distribution network.

22. The semiconductor device of claim 18, wherein the semiconductor device comprises a microprocessor.

\* \* \* \* \*